Patented Mar. 30, 1954

2,673,823

UNITED STATES PATENT OFFICE 2,673,823

METHOD OF PRODUCING VAPOR PERMEABLE FLUID IMPERMEABLE FABRIC AND PRODUCT

Lawrence P. Biefeld, Granville, and Albert R. Morrison, Newark, Ohio, assignors to Owens-Corning Fiberglas Corporation, Toledo, Ohio, a corporation of Delaware No Drawing. Application August 26, 1949, Serial No. 112,651

8 Claims. (Cl. 154—128)

This invention relates to the construction of a vapor permeable, fluid impermeable fabric and the method for producing the same. More particularly, it relates to the fabrication of a vapor permeable, water repellent fabric which may be used for tarpaulin, awnings, seat covers, and many other structural and insulation products. The product of this invention has leather-like characteristics which adapt it for use in the manufacture of gloves, footwear, luggage, purses, upholstery, wearing apparel, bookbinding, and the like.

Characteristic of these materials is the need for water repellency and good vapor permeability, especially when used in the manufacture of wearing apparel or footwear. In addition, it is desirable that the material have many other characteristics, such as high tensile and tear strength and wear and scuff resistance, to name a few. For many of the applications, some importance is directed to the non-inflammability, heat resistance, chemical and weather resistance, as well as the dimensional stability and electrical resistance of the material.

It would be practically impossible at the present time to select any known material or fabrication which would meet all or even most of the desirable characteristics. At the present time, leather is widely used for many of the applications described, but, in many instances, it is unqualified and is used merely because more suitable materials are not available. Leather is far from being water impermeable; in fact, water is transmitted through leather very readily without external pressure. Many unsuccessful attempts have been made to treat leather in a manner to impart water resistance. Its dimensional stability and weather resistance are low, especially when wet, and leather is combustible.

It is an object of this invention to produce a material which qualifies for most, if not all, of the described applications and substantially meets all of the desirable characteristics.

Another object is to produce and to provide a method for manufacturing a fabric which is vapor permeable, water or fluid repellent, and which may be used as a substitute for leather, and which, in reality, is a decided improvement over leather in many respects.

We have successfully produced a fabric having the desired characteristics. We have succeeded in combining glass fibers and other treating and impregnating materials to produce a vapor permeable, water or fluid repellent fabric which is favorably influenced by the presence of glass fibers.

We have been aware of the excellent characteristics attributed to glass fibers, and it has been our desire to utilize those fibers in a manner to derive some of their properties in a vapor permeable, water repellent fabric. We know, for example, that glass fibers have exceptional strength both in flexure and tension; that they have excellent elasticity, hardness, and flexure endurance; that they are formed of inorganic siliceous materials and, as a result, are relatively inert, weather resistant, heat resistant, non-inflammable, and have high electrical and heat insulating characteristics; and that they have excellent dimensional stability and are not attacked by solvents and most chemicals. The problem associated with the use of glass fibers is to derive a manner to incorporate glass fibers in abundance and in a form to give the desired physical characteristics while still maintaining the vapor permeability and water or fluid repellency of the fabric.

To the best of our knowledge, no one has successfully produced a fabric of the type described with or without glass fibers. Therefore, it is another object of this invention to produce a new and improved vapor permeable, water or fluid repellent fabrication reinforced with glass fibers and which, as a result, is greatly improved in many other respects by the presence of glass fibers.

In carrying out this invention, we effect a novel arrangement in a combination of glass fibers, a treating material, and a polymeric substance which is incompatible with the treating material and impervious to the fluid or water, as the case may be. The arrangement of materials provides pore-like passages through the fabric through which vapors but not water or fluids may pass, and considerable benefit is derived from the presence of glass fibers.

We employ two concepts in effecting the desired relationship of elements. One concept is based upon the fact that to derive maximum benefit from a fibrous reinforcing agent with respect to the physical characteristics, it is desirable to insure a bonding relation between the fibrous materials and the high polymeric substance. When so interbonded, the fibers and high polymeric substance form a composite mass in which the polymeric substance and the fibers are interdependent and respond together. Thus, the fibers are able to impart dimensional stability, inertness, insulation and heat resistant characteristics, tensile and tear strength, abrasion, scuff, and electrical resistance while the high polymeric substance fills the interstices between the fibers and provides a barrier to the transmission of fluids.

The other very important concept suggests a relationship whereby in the combination of two incompatible materials a spacing tends to form at their interface which may be controlled to pore-like dimensions to favor vapor and prevent fluid and water transmission. By controlling the arrangement of the interfaces between the incompatible materials, we have found that it is possible to insure continuous passage of water vapor through the combined substances to provide a fabric having the desired characteristics of vapor permeability and water or fluid repellency.

In forming a water or fluid repellent, vapor permeable fabric according to this invention, we distribute the glass fibers as a matrix throughout a substantially continuous phase of a high polymeric substance which is impervious to certain fluids and water. At least some, if not all, of the fibers have been first coated with a treating material which is incompatible with the high polymeric substance, and, as a result, pore-like openings are formed at the interface between the two incompatible materials. These pore-like openings follow the contour of the treated fibers and, for the most part, they intersect at the junctures of the treated fibers to provide pore-like passages through the fabric through which vapors but not fluids or water are allowed to pass. When strength is not a factor, all of the fibers may be coated with the treating material to produce a highly porous body having high vapor permeability but still retaining water and fluid repellency. When strength is a factor, less than all of the fibers are treated, leaving some free to receive the high polymeric substance which is selected for its adherence to glass.

A suitable matrix of glass fibers may be a woven or unwoven fabric prepared in many ways. Mats or preforms may be used in which the fibers are ordinarily haphazardly arranged in uniform distribution and felted or bonded, or both, in a manner to impart self-sufficiency to the mass. Instead of mats or preforms, bundles of discontinuous fibers or endless filaments in strand or yarn form may be woven or knitted into a cloth-like sheet or otherwise arranged in fabric form suitable for impregnation with the high polymeric substance that is incompatible with the treating material on some or all of the fibers. Alternatively, the fibers may be suspended in rather high concentration in the impregnant which may then be formed to predetermined shape, such as a layer or sheet. A combination of the described systems may be employed wherein fibers are first arranged in fabric form which is impregnated with a polymeric substance in which other treated and untreated fibers are incorporated.

Glass fibers of various diameters may be used. Excellent results have been obtained with glass fibers ranging in diameter from 3 to 20 microns. When ultra fine fibers of less than 3 microns are used, the numerous fuzzy ends stand out in a manner more completely to close the interstices between the fibers, and, in combination with the impregnant, there is produced a leather-like product having exceptional characteristics. It is not essential that all of the fibers be glass fibers as others, such as cotton, hemp, silk, wool, and even the synthetics, may be used. However, to secure in the final product some of the characteristics attributed to glass fibers, it is desirable that they predominate. In view of the non-absorbency of the glass fibers, it is apparent that the treating material will collect on the surfaces thereto to influence the formation of pore-like passages, which characteristic cannot be secured by a simple treatment of the absorbent natural fibers.

As the treating material for coating some or all of the fibers, we may use oils and fats derived from mineral, vegetable, or animal sources; waxes derived from the same sources or by synthesis; or materials, such as polyglycols, chlorinated paraffin, fatty acids, and fatty acid esters, and the like. We may use organo-silicon resins which have a high affinity for the glass fiber surfaces. Representative of the latter materials are the polysiloxane fluids which are mostly the lower molecular weight polymers, such as methyl polysiloxane, methyl ethyl polysiloxane, phenyl ethyl polysiloxane, and the like, and silanes which are halogen silanes and alkyl halogeno silanes, such as octadecyltrichlorosilane, diethyldichlorosilane, and the like.

Use may also be made of elastomers, including the synthetic and natural rubbers and their derivatives, such as chlorinated rubber, rubber hydrochloride, isoprene, butadiene - acrylonitrile copolymer, and the like. A still further group of substances which may be used comprise surface active agents, such as the cationic-active compounds based upon the ionizable salt of a basic nitrogen, sulphur, phosphorous, or arsenic atom which is readily insolubilized from water or solvent solution on the glass fiber surfaces. As a specific example, imidazoline derivatives may be used, such as diheptadecylimidazoline acetate diethyl acetamide.

These substances may be applied from water or solvent solution or as dispersions or emulsions of various concentrations depending upon the method of application. Application, in turn, may be carried out by various methods commonly used in the coating or sizing industry; that is, the solution of treating material may be wiped onto the fibers as they are formed, it may be sprayed onto the fibers, or the fibers may be carried through a bath of the treating material. The treating material may be applied after the fibers have been formed into a fabric. We have even secured the desired results when the incompatible treating material and impregnant are applied together in intimate mixture to the glass fibers in fabric form or with the glass fibers suspended therein. Ordinarily, an air-dry is sufficient to remove the diluents, or, when desired, elevated temperature may be employed for such purposes.

The impregnant is a high polymeric substance ordinarily having resin or rubber-like characteristics and which is impervious to the fluid or water and completely incompatible with the treating material. When reinforcement by the glass fibers is desired, the impregnant is selected of a material which is strongly adherent to the glass fiber surfaces. Elastomers of the type isoprene (neoprene), butadiene-acrylonitrile copolymers (Buna N), and mixtures thereof with phenolic resins are suitable. Use may also be made of the vinyl polymers and copolymers, such as polyvinylchloride, vinylchloride - vinylacetate copolymers, polyvinylidene chloride, and copolymers thereof with vinylchloride. Other resinous materials including polystyrene and the polyacrylates may also be used. Instead of the described organic materials, excellent results are secured when the impregnant comprises an organo-silicon polymer which has resinous or elastomeric characteristics. It will be understood that our invention is not limited to these specific materials because there are many others which may be used. However, we prefer to use substances which are quite flexible, and if the material itself is not sufficiently flexible, plasticized modifications thereof may be used which may also incorporate other additives, such as dyes, pigments, fillers, and the like to impart certain characteristics.

Impregnations may be made from solvent solutions or from dispersions or emulsions of the solid materials in aqueous or solvent medium. The concentration of solids may, of course, be varied to comply with the method of application. When a dip or spray process is used, the solid content may be quite low, such as in the order of 10 to 40 percent, and one or more dips may be necessary to effect the desired impregnation. When a roller coating, knife coating, or dip-squeeze process is used, higher solid content compositions may be used, as in organosols, or they may even comprise plastisols having no diluent. When solvent solutions are employed, air-drying may be sufficient to set the material, but ordinarily we prefer to expose the impregnated fabric to elevated temperatures sufficient readily to drive off the diluent and, when necessary, to fuse the polymeric substance to form a continuous phase. When measured volumetrically, the final product may be formed with 10 units of glass and 5 to 40 units of the solidified impregnant, with 10 units of glass and 10 to 20 units of impregnant being preferred.

The degree of permeability to fluids and vapors may be influenced by the treatment of the fabric before or after impregnation or by the incorporation of the hydrophobic or hydrophilic agents into the impregnating medium. When greater water impermeability or repellency is desired, the fabric may be treated with a hydrophobic compound, or heat and pressure may be applied to the fabric after impregnation. This relationship is used to offset the conditions existing when the pores around the fibers are too large. When the pores are too small, or when it is desired to increase the vapor permeability, the impregnated fabric may be treated with a hydrophilic substance. Representative of suitable hydrophobic or water repellent substances are the hydrocarbon materials constituted with at least 10 carbon atoms in chain-like arrangement, such as in oils and waxes. Metal soaps, such as aluminum stearate, calcium stearate, and the like, may be used in dilute solutions. Instead of hydrocarbons or soaps, use may be made of a cationic-active compound of the type described by Sloan, No. 2,356,542, a Werner or chrome-complex of the type described by Iler, No. 2,273,040 in which the acido group coordinated with a trivalent chromium atom is constituted with at least 10 atoms, or silanes and polysiloxanes having more than 10 carbon atoms in a single alkyl chain. Suitable hydrophilic agents may comprise such materials as the silanes, chrome-complexes, cationic-active substances, and the like constituted with short chain groups and hydroxy, amine or other functional groups having a high affinity for water. In similar respects, the fabric may be rendered more or less permeable or impermeable to a large variety of other materials.

When the described concept is followed, a fabric is produced which is vapor permeable, water repellent, and repellent to certain fluids which are resisted by the impregnating material. The desired relationship may be secured when an oil is used as the treating material and polyvinyl chloride is the impregnant; when a polysiloxane fluid, such as methyl ethyl polysiloxane is used as the treating material and isoprene is used as the impregnant; when a mixture of butadiene-acrylonitrile copolymer and phenolic resin is used as the treating material and a silicone, such as methyl phenyl polysiloxane is used as the impregnant; and when octadecylamine chloride is used as the treating material and a vinyl copolymer is used as the impregnant.

From a procedural standpoint, no difficulties arise. Part or all of the glass fibers are treated before or after they are formed into the matrix or dispersed in the impregnant. The matrix is then impregnated fully to fill the interstices between fibers, but because of the incompatibility, a spaced relation is formed between the incompatible phases of the impregnant and treating material in the final product. Since the fibers are surface coated with the treating material, it will be manifest that the spacing will correspond to the contour of the treated fibers, and at their junctures the pore-like openings will intersect in many instances. The extent of the opening appears to correspond to the diameter of the fibers, the amount of the treating material on the fiber surfaces, and the repellency of the treating material for the impregnating substance.

When it is desired to fabricate relatively thick water repellent, vapor permeable fabrics, we prefer to form relatively thin layers of impregnated fibers and then laminate two or more together to build up the desired thickness. By this arrangement, the possibility of any large openings existing through which water or fluids may travel will be greatly minimized. When formulating for a built-up fabric or laminate, it is best to select a base sheet or matrix in which the fibers are movable relative to one another; otherwise, inflexibility will result and the fabric will be unfit for many applications. A knitted fabric or felted mass of fibers is preferred over a woven fabric in such instances.

The product of this invention comprises a new arrangement of materials secured by a novel process, and because of the materials of which it is constituted and their arrangement, it is admirably fitted for its intended uses. It may be used to replace leather and in many applications it is far superior to leather. The product of this invention is able to resist penetration of water under a static head; whereas, water soaks through leather very easily.

It will be understood that numerous changes may be made in the materials, their order of application, and their manner of application without departing from the spirit of this invention, especially as defined in the following claims.

We claim.

1. A vapor permeable, water repellent fabric comprising glass fibers arranged in fabric form, a butadiene-acrylonitrile copolymer and phenolic resin composition coating at least some of the glass fibers in the fabric and a cured polysiloxane resin incompatible with the coating composition and present in the ratio of 5-40 parts by volume of the resinous material to 10 parts by volume of the glass fibers substantially completely impregnating the fabric to fill the voids thereof and providing microporous openings in the interface between the two incompatible materials.

2. A vapor permeable, water repellent fabric comprising a matrix of glass fibers in fabric form composed chiefly of glass fibers having a dimension within the range of 3-20 microns in diameter in combination with other glass fibers of less than 3 microns in diameter distributed throughout the fabric as interstitial closing members, a butadiene-acrylonitrile copolymer and a phenolic resin composition coating at least some of the glass fibers in the fabric and a cured polysiloxane resin incompatible with the coating composition and present in the ratio of 5-40 parts by volume of the resinous material to 10 parts by volume of the glass fibers substantially completely impregnating the fabric to fill the voids thereof and providing microporous openings in the interface between the two incompatible materials.

3. A vapor permeable, water repellent fabric comprising a knitted fabric of glass fibers, a butadiene-acrylonitrile copolymer and a phenolic resin composition coating at least some of the glass fibers in the fabric and a cured polysiloxane resin incompatible with the coating composition and present in the ratio of 5-40 parts by volume of the resinous material to 10 parts by volume of the glass fibers substantially completely impregnating the fabric to fill the voids thereof and providing microporous openings in the interface between the two incompatible materials.

4. The method of producing a vapor permeable, water repellent fabric comprising treating a fabric of glass fibers with a butadiene-acrylonitrile copolymer and phenolic resin composition to coat the fibers substantially throughout their lengths, impregnating the fabric of coated fibers with a polysiloxane resin incompatible with the coating composition and present in amounts substantially completely to fill the voids thereof and providing microporous openings in the interface between the two incompatible materials, and curing the polysiloxane resin to form a coated fabric which is vapor permeable and water repellent.

5. The method as claimed in claim 4 in which the fabric of glass fibers is formed of glass fibers in which the predominant portion are of a diameter ranging from 3-20 microns and the other fibers in combination therewith constitute interstitial closing glass fibers having a diameter of less than 3 microns.

6. The method as claimed in claim 4 which includes the additional step of laminating a plurality of such vapor permeable, water repellent members into a composite structure.

7. A vapor permeable, water repellent textile comprising glass fibers arranged to form a textile fabric, a coating on individual glass fibers of the fabric extending substantially throughout the lengths thereof, a flexible water insoluble organic resinous material which is incompatible with the coating on the surfaces of the individual glass fibers forming a continuous phase substantially completely impregnating the fabric and filling the voids thereof and providing microporous openings in the interface between the two incompatible materials, the water insoluble resinous material being selected from the group consisting of polyvinyl chloride, vinyl chloride-vinyl acetate copolymer, polyvinylidine chloride, polystyrene, and an organo-silicon resin, and the coating material for the individual glass fibers being a butadiene-acrylonitrile copolymer and phenolic resin composition.

8. The method of producing a vapor permeable, water repellent fabric comprising coating a fabric of glass fibers with a butadiene-acrylonitrile copolymer and a phenolic resin composition to coat the fibers substantially throughout their lengths, impregnating the fabric of coated fibers with a water insoluble resinous material selected from the group consisting of polyvinyl chloride, vinyl chloride-vinyl acetate copolymer, polyvinylidine chloride, polystyrene, and an organo-silicon resin which are incompatible with the coating composition and present in amounts substantially completely to fill the voids thereof and providing microporous openings in the interface between the two incompatible materials, and curing the impregnated resinous material to form a coated fabric which is vapor permeable and water repellent.

LAWRENCE P. BIEFELD.
ALBERT R. MORRISON.

References Cited in the file of this patent
UNITED STATES PATENTS

| Number | Name | Date |
|---|---|---|
| 2,229,975 | Kaplan | Jan. 28, 1941 |
| 2,324,466 | Bowen et al. | July 20, 1943 |
| 2,335,102 | Bergin | Nov. 23, 1943 |
| 2,428,591 | Slayter | Oct. 7, 1947 |
| 2,428,654 | Collins | Oct. 7, 1947 |
| 2,436,304 | Johannson | Feb. 17, 1948 |
| 2,474,201 | Raymond et al. | June 21, 1949 |
| 2,517,753 | Ximenez et al. | Aug. 8, 1950 |
| 2,523,759 | Grant | Sept. 26, 1950 |
| 2,575,577 | Beauchamp | Nov. 20, 1951 |
| 2,590,493 | Berberich et al. | Mar. 25, 1952 |